Oct. 31, 1950 J. M. TYRNER 2,528,478

AMPLIFIER GENERATOR

Filed March 10, 1945 5 Sheets-Sheet 1

INVENTOR.

Joseph M. Tyrner

BY

Emery, Varney, Whittemore & Dix
attorneys

INVENTOR.
Joseph M. Tyrner
BY
Emery, Varney, Whittemore & Dix
Attorneys

Oct. 31, 1950 J. M. TYRNER 2,528,478

AMPLIFIER GENERATOR

Filed March 10, 1945 5 Sheets-Sheet 3

INVENTOR.

Joseph M. Tyrner

BY Emery, Varney, Whittemore & Dix attorneys

INVENTOR.
Joseph M. Tyrner
BY
Emery, Varney, Whittemore & Dix
attorneys

INVENTOR.
Joseph M. Tyrner
BY Emery, Varney, Whittemore & Dix
Attorneys

UNITED STATES PATENT OFFICE 2,528,478

AMPLIFIER GENERATOR

Joseph M. Tyrner, New York, N. Y.

Application March 10, 1945, Serial No. 582,105

5 Claims. (Cl. 322—91)

This invention relates to generators and more particularly to generators of the type in which the variation in a pilot exciting energy supplied to a field winding causes an amplified output energy of the generator to vary with the variations in the pilot energy. By making the energy output of the generator vary with quick response directly with the pilot energy supply, the generator can be used in a variety of control combinations where considerable power is to be controlled by a small pilot energy.

In its broader aspects, it is an object of this invention to provide an improved control apparatus in which a power supply of substantial magnitude can be controlled by a small pilot power supply. A more specific object is to provide an improved and simplified generator for amplifying a pilot energy to a substantially greater energy in a circuit capable of operating under heavy loads.

The invention comprises a generator with 3 field pole structures for each 360 electrical degrees. In the description and in the claims the term "degrees" without qualification means electrical degrees, and the expression "electrical degrees" is used to refer to the divisions of the angle through which a conductor moves while the voltage in the conductor passes through one cycle. Thus in a machine in which the voltage in a conductor passes through two full cycles during one revolution of the armature, the 360 mechanical degrees of the generator frame, correspond to 720 electrical degrees, and if the frame has a total of 6 pole structures, there are 3 such pole structures for each 360 electrical degrees.

It is a feature of the invention that the armature has a pitch of 120° and has relative rotation in a field generated by 3 pole structures for each 360°. The pole structures are preferably salient pole pieces, either integral or composite, and preferably surrounded by field windings. The pole structures need not be salient, however, and it is not essential that all of them have windings.

The machine of this invention, referred to as the "Triodyne" because of its triplicity of poles, will be described first in its most general form in which it is suitable for use as a converter as described in my copending application Serial No. 506,533, filed October 16, 1943, now Patent No. 2,388,023 issued October 30, 1945, and the differences in structure that produce the new results of this invention will then be explained. For the purposes of further simplifying the explanation, the invention will be described as applied to a 3 pole machine, it being understood that the machine can have any multiple of 3 poles, such as 6, 9, 12, etc., by merely duplicating the relation of poles successively around the frame.

Other objects, features and advantages of the invention will appear or be pointed out as the description proceeds.

In the drawings, forming a part hereof, in which like reference characters indicate corresponding parts in all the views.

The Triodyne coordinates three energies, two of which are electrical while the third one is mechanical. Two of them may be chosen arbitrarily. The third one is determined by the requirement that the sum of all three be zero.

Figures 15, 17:
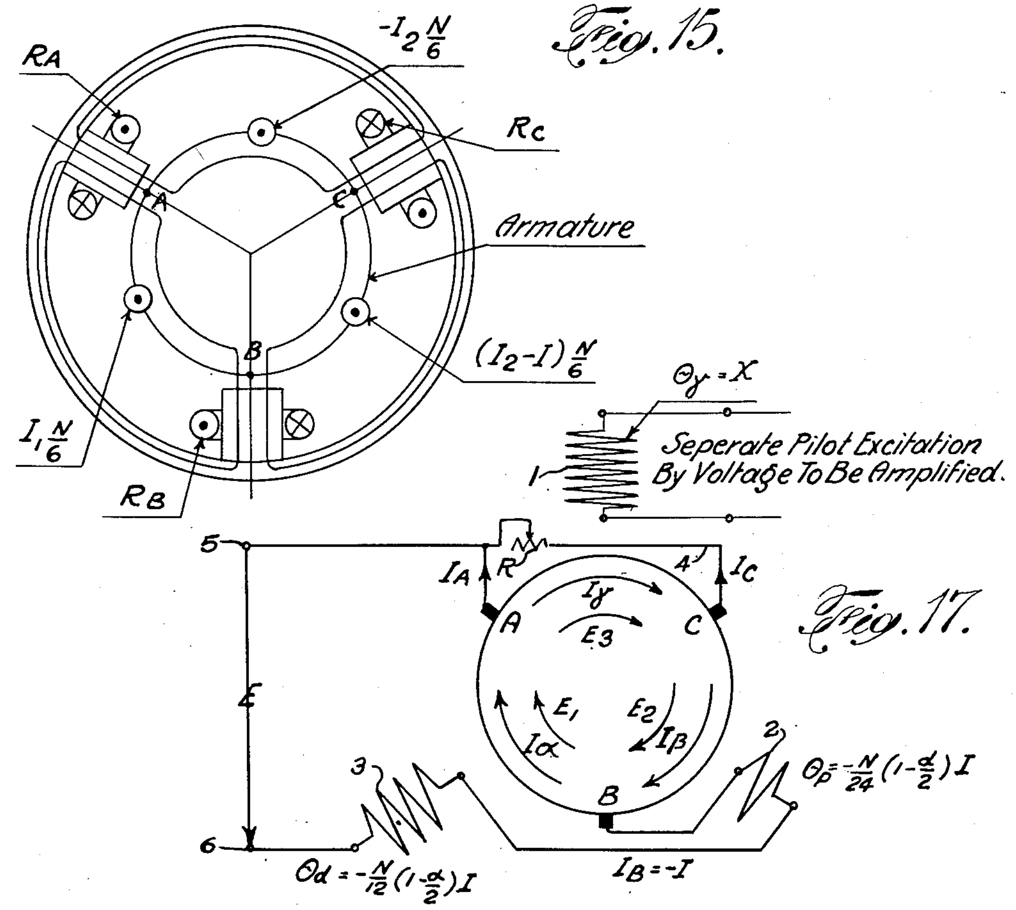
Figure 15 is a diagram illustrating the location of inter-poles for improving commutation.
Figure 17 is a diagram showing the wiring of the Triodyne for amplifying a pilot voltage.

Referring first to Fig. 17, the illustrated amplifying generator has three equally spaced field poles equipped with respective field windings 1, 2 and 3. The generator armature has a commutator with three equally spaced brushes A, B and C which are disposed between the field poles. The brushes A and C are short-circuited by a conductor 4 of low or negligible resistance which may include an adjustable resistor R. The field winding 1 serves as a pilot winding. It is separately excited from a source of a small variable voltage to be amplified by the generator. As will be explained in the following, the variable field produced by the pilot winding 1 causes a slight voltage difference to appear between the brushes A and C which in turn causes a short-circuit current to flow through the conductor 4, thus exciting the field structure of the machine by armature reaction. This excitation produces an amplified voltage difference between the two brushes A and C on the one hand and the third brush B on the other hand. The output terminals 5 and 6 of the machine are connected to the conductor 4 and to the brush B, respectively. The connection includes in series the two field windings 2 and 3 whose performance will be explained in a latter place.

Figure 1:
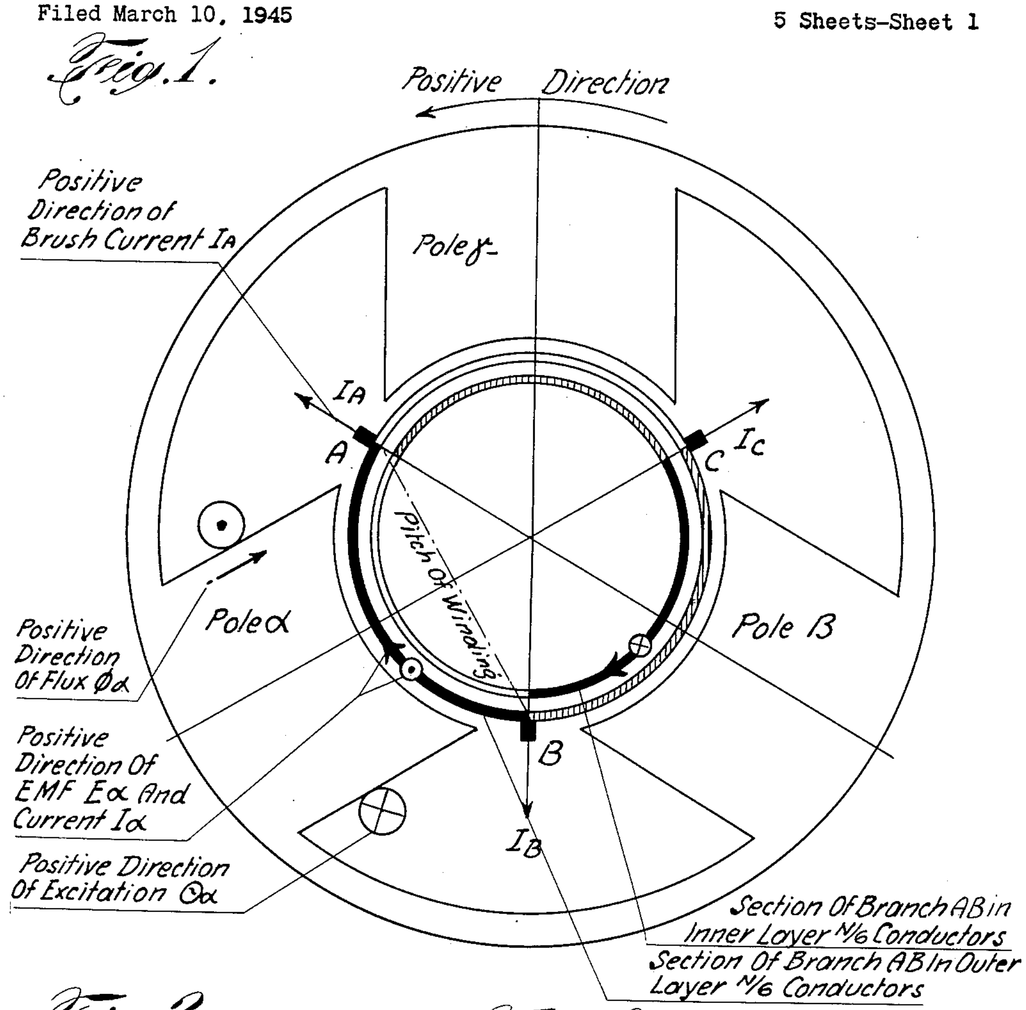
Figure 1 is a diagrammatic view of a machine embodying this invention, and illustrating the relation of the armature winding to the field poles and the positive directions of current, voltage, flux, and excitation.

The magnetic pole structure of the machine is shown in Fig. 1 where the poles for windings 3, 2 and 1 are denoted by $\alpha$, $\beta$ and $\gamma$ respectively. The armature has a conventional D. C. winding but with a pitch of 120°. The positive direction of the machine is the direction in which the armature winding progresses.

Three equally spaced brushes on the commutator divide the armature into three branches. The coils of each branch have conductors under one pole and return conductors under the following pole. The conductors under a pole are considered as a section of the branch, and it may be said that each branch consists of two sections connected in series.

It is imperative to be very consistent in the definition of the positive sense of every quantity involved. Arrows in diagrams usually indicate the positive direction but not the direction of the actual numerical value. The numerical value may be negative and in fact a certain number of them have to be negative to satisfy the basic equations.

All denominations are for a machine with one pole triplet and for machines with larger numbers of triplets because all triplets are alike and repetitions of each other.

A field is positive if it emerges from the face of a pole, that is if the pole is a North pole. The excitation of a pole is positive if it produces such a flux.

Positive flux with positive rotation produces the positive direction of electromotive force. The positive current is driven by the positive electromotive force and subsequently generator load is denoted as positive load.

The brushes are denominated A, B and C and the poles $\alpha$, $\beta$ and $\gamma$. Brush A is followed by pole $\alpha$, B by pole $\beta$, and C by pole $\gamma$.

The terminal voltage between brushes A and B is $E_1$. In coordination with all previews definitions, outside of the machine $E_1$ is positive from A to B but inside the armature from B to A. The positive brush current $I_A$ leaves the brush A. Inside of the armature, $E_1$ is the difference between the voltages $E_\alpha$ and $E_\beta$ because the branch AB has its two sections under the poles $\alpha$ and $\beta$. The brush current $I_A$ is the difference of the two armature currents $I_\alpha$ and $I_\gamma$ because the $\alpha$ section of branch AB and the $\gamma$ section of branch CA meet under brush A.

Figure 2:
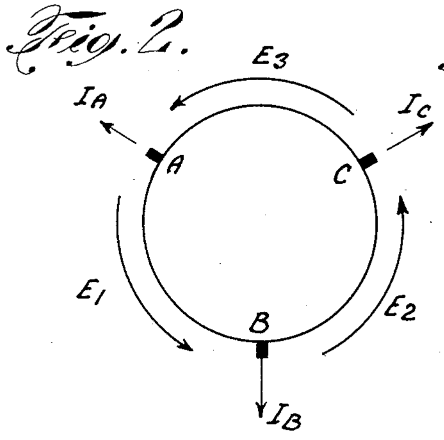
Figure 2 is a diagram of the machine shown in Figure 1 illustrating the direction of voltages in the circuits outside of the armature.

All positive directions are illustrated in Figures 1 and 2.

*Voltage and current equations, Kirchhoff's law*

According to Figure 1 the flux $\phi_\alpha$ of pole $\alpha$ induces the voltage E in the outer section of branch AB and in the inner section of branch CA. In the same way the fluxes $\phi_\beta$ and $\phi_\gamma$ induce the voltages $E_\beta$ and $E_\gamma$ in other sections.

The sum of all fluxes has to be zero because no unipolar induction is present $$\phi_\alpha+\phi_\beta+\phi_\gamma=0 \quad (1)$$

and consequently $$E_\alpha+E_\beta+E_\gamma=0 \quad (2)$$

or $$E_\gamma=-E_\alpha-E_\beta \quad (3)$$

On the other hand $$E_1+E_2+E_3=0 \quad (4)$$

or $$E_3=-E_1-E_2 \quad (5)$$

because the sum of the voltages around the armature has to be zero.

The terminal voltages $E_1$, $E_2$ and $E_3$ are the differences of two section voltages.

$$\begin{aligned} E_1&=E_\alpha-E_\beta \\ E_2&=E_\beta-E_\gamma \\ E_3&=E_\gamma-E_\alpha \end{aligned} \quad (6)$$

I can substitute (3) and simplify to $$\begin{aligned} E_1&=E_\alpha-E_\beta \\ E_2&=E_\alpha+2E_\beta \\ E_3&=-2E_\alpha-E_\beta \end{aligned} \quad (7)$$

In a similar way I obtain $$\begin{aligned} E_\alpha&=\tfrac{1}{3}[2E_1+E_2] \\ E_\beta&=\tfrac{1}{3}[-E_1+E_2] \\ E_\gamma&=\tfrac{1}{3}[-E_1-2E_2] \end{aligned} \quad (8)$$

The sum of the brush currents has to be zero.

$$I_A+I_B+I_C=0 \quad (9)$$

or $$I_B=-I_A-I_C \quad (10)$$

because no electricity can accumulate in the armature.

According to the second law of Kirchhoff the sum of the internal currents is zero.

$$I_\alpha+I_\beta+I_\gamma=0 \quad (11)$$

or $$I_\gamma=-I_\alpha-I_\beta \quad (12)$$

The brush currents $I_A$, $I_B$, $I_C$ are the differences of internal currents $$\begin{aligned} I_A&=I_\alpha-I_\gamma \\ I_B&=I_\beta-I_\alpha \\ I_C&=I_\gamma-I_\beta \end{aligned} \quad (13)$$

by substituting (12) I obtain $$\begin{aligned} I_A&=2I_\alpha+I_\beta \\ I_B&=-I_\alpha+I_\beta \\ I_C&=-I_\alpha-2I_\beta \end{aligned} \quad (14)$$

and by a similar substitution $$\begin{aligned} I_\alpha&=\tfrac{1}{3}[2I_A+I_C] \\ I_\beta&=\tfrac{1}{3}[-I_A-2I_C] \\ I_\gamma&=\tfrac{1}{3}[-I_A+I_C] \end{aligned} \quad (15)$$

Figure 3:
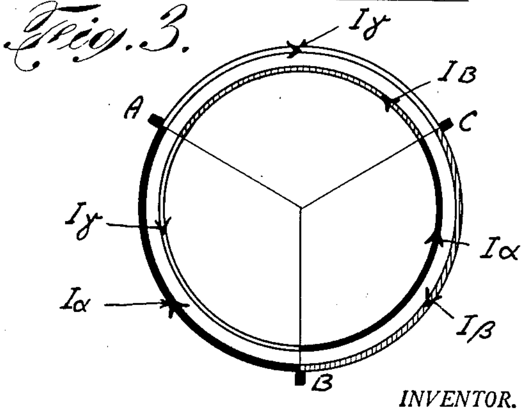
Figure 3 is a diagram of the inner and outer sections of the armature winding with the directions of current in the different branches indicated.
Figures 4, 5, 6:
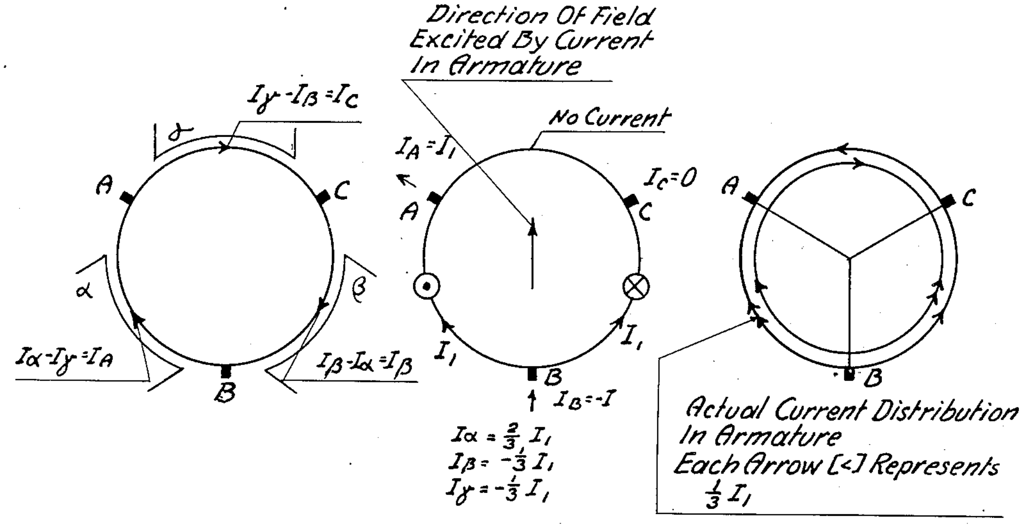
Figure 4 is a simplification of the diagram of Figure 3 into a fictitious one-layer winding.
Figures 5 and 6 are diagrams illustrating the simplest current distribution in the armature.

In Figure 3 the three branches of the armature winding with their outer and inner sections are shown. It can be seen that the two layers under one pole carry different currents. I may combine these two currents to a fictitious current flowing in a fictitious one-layer winding. This fictitious winding with the fictitious currents represents the magnetic reaction of the armature. The six sections of the original winding have $$\frac{N}{6}$$

conductors each, if the armature circumference has N conductors. The fictitious winding has $$\frac{N}{6}$$

conductors between adjacent brushes and has only $$\frac{N}{2}$$

conductors on the whole circumference. In Figure 4 these fictitious currents are shown. The armature reacts as if the current $I_A$ would flow in positive direction in $$\frac{N}{6}$$

conductors under pole $\alpha$ with $I_B$ under $\beta$ and $I_C$ under $\gamma$.

In Figures 5 and 6 the simplest current distribution is investigated. Current leaves the armature in A and returns on B while C is not involved.

$$\begin{aligned} I_A&=I_1 \\ I_B&=I_1 \\ I_C&=0 \end{aligned} \qquad (16)$$

In Figure 5 the fictitious currents and the direction of the flux excited by the armature is depicted for this case. Figure 6 shows how the current actually is distributed. Two paths are open, a short one and a twice as long one; two thirds of the current takes the short way one third the long path. The resistance drop is the same for both paths.

*Induction of voltage*

Figure 7:
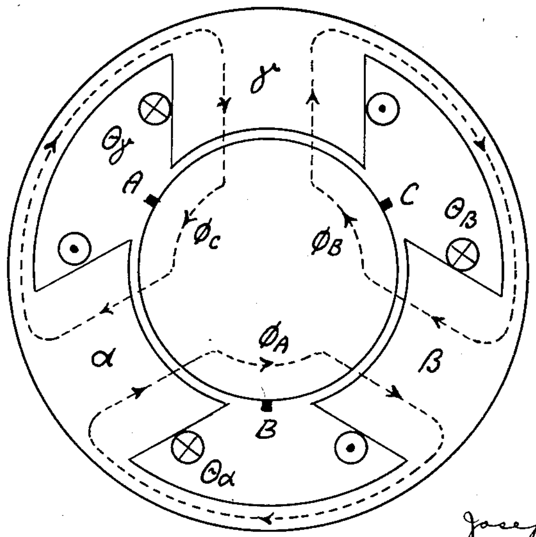
Figure 7 is a diagram illustrating flux distribution in the machine shown in the other figures.

I have said that the flux $\phi_\alpha$ emerges from the face of pole $\alpha$. Actually flux $\phi_\alpha$ is the difference of two fluxes, one flowing to pole $\beta$ and one coming from pole $\gamma$. This is shown in Figure 7.

I may write $$\begin{aligned} \phi_\alpha&=\phi_A-\phi_C \\ \phi_\beta&=\phi_B-\phi_A \\ \phi_\gamma&=\phi_C-\phi_B \end{aligned} \qquad (17)$$

I assume that the machine is not saturated and that the fluxes are proportional to the excitations. This assumption permits me to superimpose different fluxes. I neglect all leakage fluxes.

I have $$\begin{aligned} \phi_A&=K_1(\theta_\alpha-\theta_\beta) \\ \phi_B&=K_1(\theta_\beta-\theta_\gamma) \\ \phi_C&=K_1(\theta_\gamma-\theta_\alpha) \end{aligned} \qquad (18)$$

and $$\begin{aligned} \phi_\alpha&=K_1(2\theta_\alpha-\theta_\beta-\theta_\gamma) \\ \phi_\beta&=K_1(2\theta_\beta-\theta_\gamma-\theta_\alpha) \\ \phi_\gamma&=K_1(2\theta_\gamma-\theta_\alpha-\theta_\beta) \end{aligned} \qquad (19)$$

The section voltages are induced by the flux of the pole under which the section is located.

$$\begin{aligned} E_\alpha&=k_2\phi_\alpha \\ E_\beta&=k_2\phi_\beta \\ E_\gamma&=k_2\phi_\gamma \end{aligned} \qquad (20)$$

By substituting (20) and (19) in (6) and setting $3k_1k_2=k$. (21)

I obtain the equations:

$$\begin{aligned} E_1&=K(\theta_\alpha-\theta_\beta)=3K_2\phi_A \\ E_2&=K(\theta_\beta-\theta_\gamma)=3K_2\phi_B \\ E_3&=K(\theta_\gamma-\theta_\alpha)=3K_2\phi_C=-E_1-E_2 \end{aligned} \qquad (22)$$

Each voltage depends on the difference of two excitations, while the third excitation is not involved. Two voltages may be chosen arbitrarily. The third voltage is determined by Equation 5. On the other hand an infinite number of excitation satisfies Equation 22 because I always can add the arbitrary value $x$ to all excitations without changing the value of their difference.

$$E_1=K[(\theta_\alpha+x)-(\theta_\beta+x)]=K[\theta_\alpha-\theta_\beta] \qquad (23)$$

I can make use of this fact to distribute the excitation in the most efficient way.

In Figure 5 the voltage for current $I_A=I_1$ would be generated by excitation on poles $\alpha$ and $\beta$. The armature reaction has the character of a negative excitation on the pole $\gamma$. Therefore the armature reaction would not influence the voltage driving $I_1$.

Figure 8:
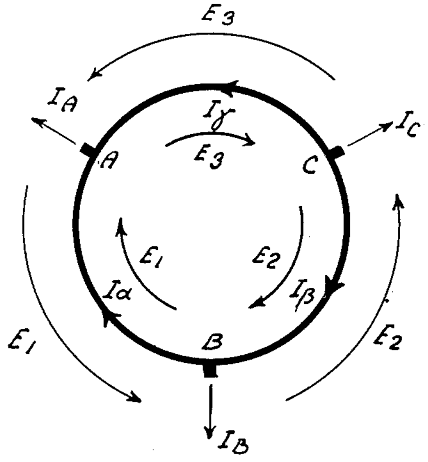
Figure 8 is a diagram of the armature and brushes and illustrating the internal currents of the armature.

In Figure 8 the Triodyne armature is shown with the three brush currents and the internal currents. The electrical energy of the armature is $$L=I_\alpha E_1+I_\beta E_2+I_\gamma E_3 \qquad (24)$$

Substituting (15) and (5)

$$M=1/3\{(2I_A+I_C)E_1-(I_A-2I_C)E_2+(-I_A-I_C)(-E_1-E_2)\}=I_AE_1-I_CE_2 \qquad (25)$$

Figure 9:
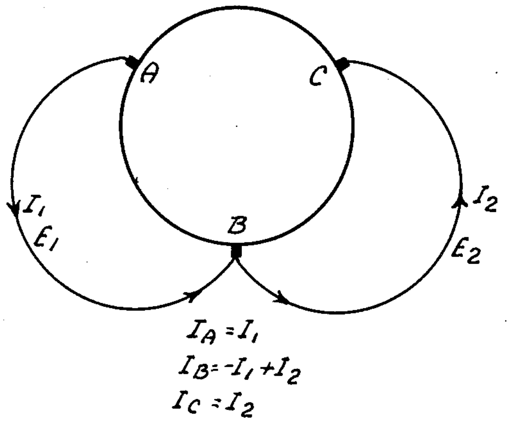
Figure 9 is a diagram illustrating the effective external circuits of the Triodyne.

Electrically the Triodyne behaves as though it had two independent circuits as shown in Figure 9. One circuit operates with the voltage $E_1$ and the current $I_1=I_A$. The other circuit has the voltage $E_2$ and the current $I_2=-I_C$. The minus sign of $I_C$ is due to the fact that the positive direction of $I_C$ is opposite to the positive direction of $E_2$ which is the driving voltage. I correct that by introducing $I_2$. The third brush current is determined by Equation 9

$$I_B=-I_A-I_C=-I_1+I_2 \qquad (26)$$

I call $I_1$ and $I_2$ the two basic currents and $E_1$ and $E_2$ the two basic voltages. All other currents and voltages may be figured out of them.

The two basic voltages are determined by the choice of the combination of excitations (22). The currents are determined by the circuit. The energy transaction of the Triodyne is determined by $$M=I_1E_1+I_2E_2 \qquad 27)$$

M is the mechanical energy which has to be impressed on the Triodyne. If M is positive the Triodyne is predominantly a generator, if M is negative motor load predominates. If M is zero the Triodyne is a converter. It may be noted that the losses in the iron as well as the losses by windage and friction may be considered as mechanical loads.

Figure 10:
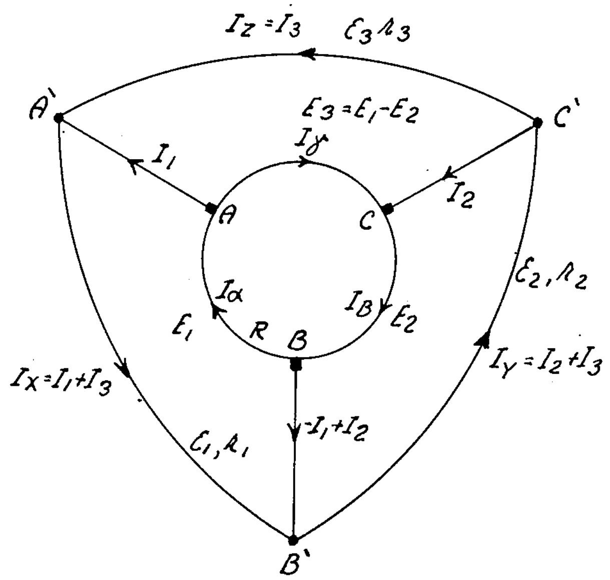
Figure 10 is a diagrammatic illustration of the complete circuit of the Triodyne.

The complete circuit of the Triodyne is shown in Figure 10. The Triodyne armature is in the center. In the branches of the armature flow the currents $I_\alpha$, $I_\beta$ and $I_\gamma$. The brush currents are $$\begin{aligned} I_A&=I_1 \\ I_B&=-I_1+I_2 \\ I_C&=-I_2 \end{aligned} \qquad (28)$$

In the junction points A', B' and C' the brush currents fork into the currents of the external circuit $I_x$, $I_y$ and $I_z$.

This shows that $$\begin{aligned} I_X &= I_1 + I_3 \\ I_Y &= I_2 + I_3 \\ I_2 &= I_3 \end{aligned} \quad (29)$$

and I can consider $I_3$ a circulating current which has nothing to do with the Triodyne load.

The Triodyne armature voltages $E_1$, $E_2$, work in conjunction with the external voltages $e_1$, $e_2$ and $e_3$. The resistances of the external current are $r_1$, $r_2$ and $r_3$ while the resistance of an armature branch is R.

I apply Kirchhoff's law to the Triodyne armature $$E_1+E_2+E_3-R(I_\alpha+I_\beta+I_\gamma)=0 \quad (30)$$

The sum of the three voltages has to be zero or there would be unipolar induction Therefore $$I_\alpha+I_\beta+I_\gamma=0$$

This was stated before in Equation 11 but without elaboration.

For the external circuit I find the equation $$e_1+e_2+e_3-I_Xr_1-I_Yr_2-I_2r_3=0 \quad (31)$$

Substituting (29)

$$e_1+e_2+e_3-I_1r_1-I_2r_2-I_3(r_1+r_2+r_3)=0 \quad (32)$$

For the brush currents and the branch currents I use (15) and obtain $$\begin{aligned} I_\alpha &= 1/3[2I_1-I_2] \\ I_\beta &= 1/3[-I_1+2I_2] \\ I_\beta &= 1/3[-I_1-I_2] \end{aligned} \quad (33)$$

I need two more equations which I find by using Kirchhoff's law on the circuits A—A′—B′—B and B—B′—C′—C.

$$E_1+e_1-I_2R-I_Xr_1= E_1+e_1-1/3[2I_1-I_2]R-(I_1+I_3)r_1= E_1+e_1-I_1(2/3R+r_1)-I_2\frac{R}{3}-I_3r_1=0 \quad (34)$$

and $$E_2+e_2-I_BR-I_yr_2= E_2+e_2-1/3[-I_1+2I_2]R-(I_2+I_3)r_2= E_2+e_2-I_2(2/3R+r_2)-I_1\frac{R}{3}-I_3r_2 \quad (35)$$

I find the two basic currents by means of the Equations 32, 34 and 35 which are repeated here.

$$e_1+e_2+d_3-I_1r_1-I_2r_2-I_3(r_1+r_2+r_3)=0 \quad (36)$$

$$E_1+e_1-I_1\left(\frac{2}{3}R+r_1\right)-I_2\frac{R}{3}-I_3r_1=0 \quad (37)$$

$$E_2+e_2-I_2\left(\frac{2}{3}R+r_2\right)-I_1\frac{R}{3}-I_3r_2=0 \quad (38)$$

Usually the outside circuit is not completed between C′ and A′ or $$r_3\rightarrow\infty \quad I_3=0 \quad e_3=0 \quad (39)$$

which eliminates Equation 36 if R is negligible (37) and (38) are reduced to $$E_1+e_1-I_1r_1=0 \quad (40)$$

$$E_2+e_2-I_2r_2=0 \quad (41)$$

which indicates two complete separate circuits. The two circuits are interlocked only if the armature resistance has appreciable influence.

In Figure 6 the distribution of one current was shown. I may use the same method to show the distribution of both basic currents in the armature sections. This is done in Figure 11. It is evident the two currents partially cancel each other.

The three internal currents are (15)

$$\begin{aligned} I_\alpha &- \frac{2}{3}I_1-\frac{1}{3}I_2 \\ I_\beta &= -\frac{1}{3}I_1+\frac{2}{3}I_2 \\ I_\gamma &= -\frac{1}{3}I_1-\frac{1}{3}I_2 \end{aligned} \quad (42)$$

Figures 11, 12, 13, 14:
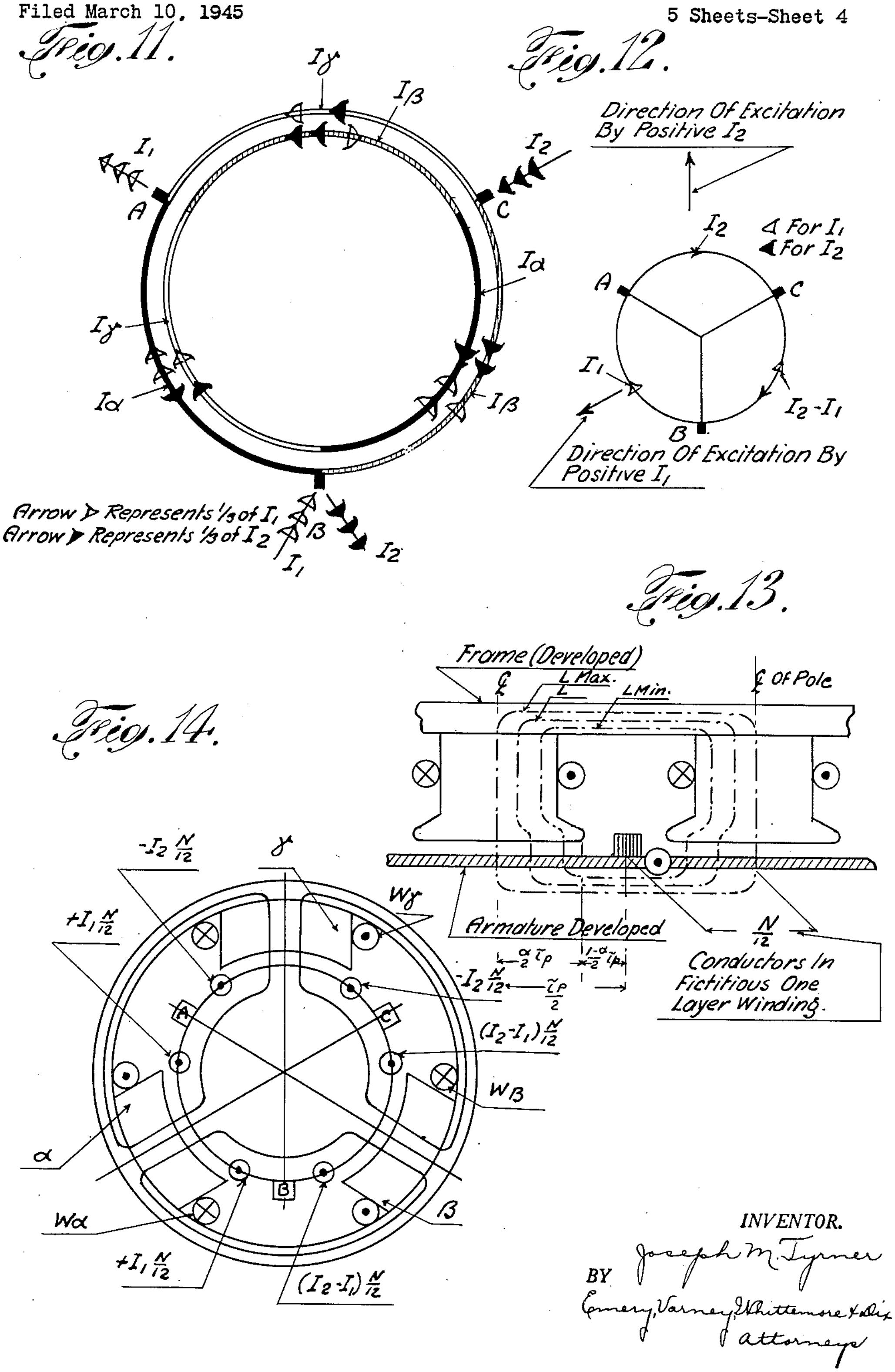
Figure 11 is a diagrammatic illustration showing of the various basic currents in the different sections of the armature.
Figure 12 is a diagram showing the direction of excitation by the armature currents.
Figure 13 is a development of a portion of the armature and a frame for illustrating the relation of the armature conductors to the flux from the successive poles.
Figure 14 is a diagrammatic showing of the entire machine with compensating windings on the different poles.

The fictitious currents which are the sum of the currents in both layers may be determined in Figure 11. They are shown in Figure 13.

*Compensation*

The complete compensation of the armature fields is necessary in most cases to make the voltages $E_1$ and $E_2$ independent from the load.

In Figure 13 the circumference of the armature is developed into a straight line. Two adjacent poles and the brush between them are shown. The armature winding is represented by a layer of current which changes its value at the location of the brush. The armature field is represented by three lines of forces: L maximum through the centers of the poles, L minimum through the tips of the poles and a line L between them. The pole pitch is $\tau p$ and the pole arc $\alpha\tau p$. Coils with indication of positive sense of excitation are shown on the poles.

The line L maximum embraces the maximum of ampere wires on the armature. It is evident that line L maximum embraces two sections with $$\frac{N}{12}$$

conductors with two different fictitious currents. The line L minimum embraces a minimum of excitation which is only $(1-\alpha)$ of that embraced by L maximum. The average amount of excitation is embraced by the line L which embraces $$\left(1-\frac{\alpha}{2}\right)\frac{N}{12}$$

conductors. All lines embrace two compensating excitations W on the two adjacent poles. The whole machine with the fictitious currents and the three compensation windings is shown in Figure 14.

I accept the line L as the average. Then the total excitation embraced by them on armature and poles has to be zero.

For the line around brush A $$W\alpha-W\gamma+(I_1-I_2)\frac{N}{12}\left(1-\frac{\alpha}{2}\right)=0 \quad (43)$$

and for the two other lines $$W\beta-W\alpha+(I_1+I_2-I_1)\frac{N}{12}\left(1-\frac{\alpha}{2}\right)=0 \quad (44)$$

$$W\gamma-W\beta+(I_2-I_1-I_2)\frac{N}{12}\left(1-\frac{\alpha}{2}\right)=0 \quad (45)$$

that lead to $$\begin{aligned} W\alpha-W\gamma &= (I_2-I_1)\frac{N}{12}\left(1-\frac{\alpha}{2}\right) \\ W\beta-W\alpha &= -I_2\frac{N}{12}\left(1-\frac{\alpha}{2}\right) \\ W\gamma-W\beta &= I_1\frac{N}{12}\left(1-\frac{\alpha}{2}\right) \end{aligned} \quad (46)$$

These equations can be satisfied by an indefinite number of combinations of $W\alpha$, $W\beta$ and $W\gamma$.

For improving the commutation it is advantageous to use inter-poles. The fields under these inter-poles can be found in a way similar to the procedure employed above.

Figure 15 shows the armature with the three inter-poles $$R_A - R_C = I_2 \frac{N}{6}$$
$$R_B - R_A = I_1 \frac{N}{6} \qquad (47)$$
$$R_C - R_B = (I_1 - I_2)\frac{N}{6}$$

Again these equations may be satisfied by an indefinite number of combinations for $R_A$, $R_B$ and $R_C$.

*The armature reaction of the Triodyne*

If the armature reaction of the Triodyne is not compensated, the armature contributes to the excitation of the three fields $\phi_A$, $\phi_B$ and $\phi_C$.

I call the components excited by the armature $$\phi'_A,\ \phi'_B \text{ and } \phi'_C.$$

According to Figures 7 and 14

$$\phi'_A = -k_1 I_2 \frac{N}{12}\left(1-\frac{\alpha}{2}\right)$$
$$\phi'_B = +k_1 I_1 \frac{N}{12}\left(1-\frac{\alpha}{2}\right) \qquad (76)$$
$$\phi'_C = k_1 (I_2 - I_1)\frac{N}{12}\left(1-\frac{\alpha}{2}\right)$$

Figure 16:
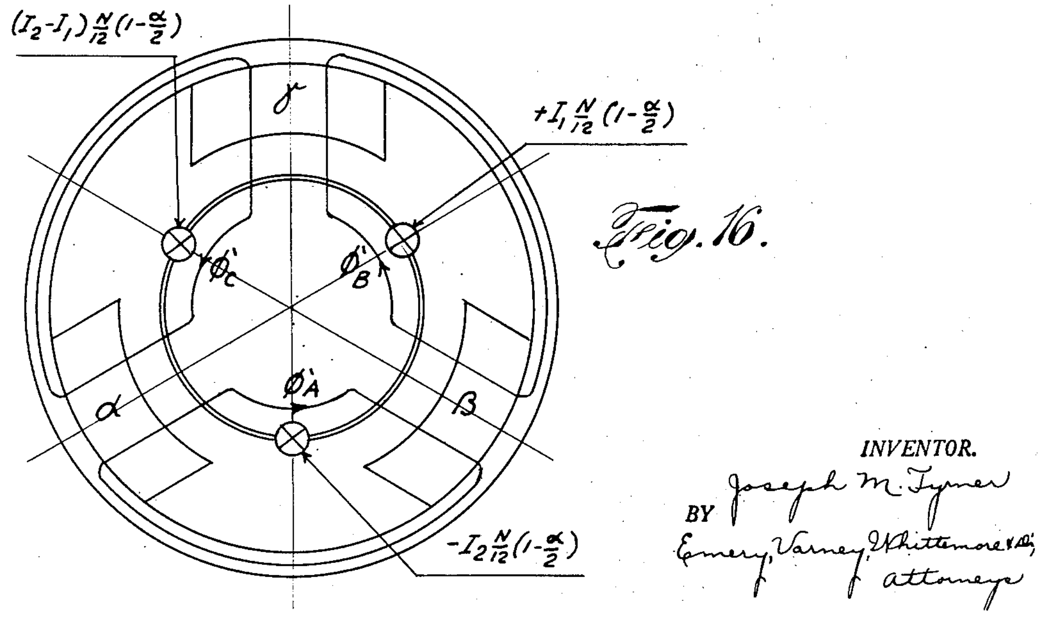
Figure 16 is a diagram showing the excitation provided by the armature.

This is shown in Figure 16 where the excitation by the armature and its contribution to the field is shown with the proper sign.

These armature fields together with fields excited by the pole excitations $\theta_\alpha$, $\theta_\beta$ and $\theta_\gamma$ generate the voltages $E_1$, $E_2$ and $E_3$.

I use Equations 22 but consider the contribution by the armature.

$$E_1 = k\left[\theta_\alpha - \theta_\beta - I_2 \frac{N}{12}\left(1-\frac{\alpha}{2}\right)\right]$$
$$E_2 = k\left[\theta_\beta - \theta_\gamma + I_1 \frac{N}{12}\left(1-\frac{\alpha}{2}\right)\right] \qquad (77)$$
$$E_3 = k\left[\theta_\gamma - \theta_\alpha + (I_2 - I_1)\frac{N}{12}\left(1-\frac{\alpha}{2}\right)\right]$$

*The Triodyne as an amplifier*

If the Triodyne is used with the circuit of Figure 17 the effect of the excitation on pole $\gamma$ is amplified by the interaction of the armature currents.

I figure the three voltages $E_1$, $E_2$ and $E_3$ by means of Equations 77 but I substitute the currents $I$ and $I_\gamma$.

According to Equation 42

$$I_\gamma = -\frac{1}{3}[I_1 + I_2] \qquad (78)$$

The current $I$ equals $-I_B$

Therefore according to (28)

$$I = +I_1 - I_2 \qquad (79)$$

and consequently $$I_1 = +\frac{1}{2}I - \frac{3}{2}I_\gamma \qquad (80)$$
$$I_2 = -\frac{1}{2}I - \frac{3}{2}I_\gamma$$

The result of the substitution is $$E_1 = k\left[\theta_\alpha - \theta_\beta + \frac{N}{12}\left(1-\frac{\alpha}{2}\right)\left(+\frac{1}{2}I + \frac{3}{2}I_\gamma\right)\right]$$
$$E_2 = k\left[\theta_\beta - \theta_\gamma + \frac{N}{12}\left(1-\frac{\alpha}{2}\right)\left(+\frac{1}{2}I - \frac{3}{2}I_\gamma\right)\right] \qquad (81)$$
$$E_3 = k\left[\theta_\gamma - \theta_\alpha - \frac{N}{12}\left(1-\frac{\alpha}{2}\right)I\right]$$

I make $$\theta_\alpha = -\frac{N}{12}\left(1-\frac{\alpha}{2}\right)I$$
$$\theta_\beta = -\frac{N}{12}\left(1-\frac{\alpha}{2}\right)\frac{I}{2} \qquad (82)$$
$$\theta_\gamma = X$$

That leads to $$E_1 = k\frac{N}{8}\left(1-\frac{\alpha}{2}\right)I_\gamma$$
$$E_2 = -kX - k\frac{N}{8}\left(1-\frac{\alpha}{2}\right)I_\gamma \qquad (83)$$
$$E_3 = kX$$

The voltage $E_3$ is used only to overcome the IR drop of $I_\gamma$ in the circuit which consists of the armature section between brushes A and C and the outside resistance R′. I denote the total resistance of this circuit by R Therefore $$I_\gamma R = E_3 = kX \qquad (84)$$

or $$I_\gamma = \frac{k}{R}X \qquad (85)$$

The terminal voltage of the generator is $$E = E_1 - I_\alpha R \qquad (86)$$

or $$E = -(E_2 - I_\beta R) \qquad (87)$$

I figure $I_\alpha$ and $I_\beta$ by means of (42) and (80).

$$I_\alpha = +\frac{1}{2}I - \frac{1}{2}I_\gamma \qquad (88)$$
$$I_\beta = -\frac{1}{2}I - \frac{1}{2}I_\gamma \qquad (89)$$

I substitute (83), (85) and (88) into (86)

$$E = k\frac{N}{8}\left(1-\frac{\alpha}{2}\right)\frac{k}{R}X + \frac{1}{2}kX - \frac{1}{2}IR$$
$$= kX\left[\frac{N}{8}\left(1-\frac{\alpha}{2}\right)\frac{k}{R} + \frac{1}{2}\right] - \frac{1}{2}IR \qquad (90)$$

or I use (83), (85) and (89) in (87)

$$E = kX + kX\frac{N}{8}\left(1-\frac{\alpha}{2}\right)\frac{k}{R} - \frac{1}{2}IR - \frac{1}{2}kX$$
$$= kX\left[\frac{N}{8}\left(1-\frac{\alpha}{2}\right)\frac{k}{R} + \frac{1}{2}\right] - \frac{1}{2}IR \qquad (91)$$

Naturally both ways lead to the same result and the factor $\lambda$ $$\lambda = \frac{N}{8}\left(1-\frac{\alpha}{2}\right)\frac{k}{R} + \frac{1}{2} \qquad (92)$$

is the amplification factor which indicates the amplification of the excitation X.

The amplification factor of the Triodyne can be changed by increasing or decreasing the resistance R′ of the circuit between the brushes A, C. When used for control purposes that make it desirable to have an adjustable amplification factor, a rheostat is provided in the external circuit between the brushes A and C, as shown in Figure 17.

The field windings can be made to compensate the IR drop and make the voltage independent of the load by making $$\theta_\beta = -\frac{N}{12}\left(1-\frac{\alpha}{2}\right)\frac{I}{2} - I\frac{R}{2k}$$

This makes $E=k\lambda X$

Changes and modifications can be made in the embodiments of the invention described and some features of the invention can be used in different combinations.

I claim as my invention:

1. An amplifier generator system comprising a generator with three field pole structures for each 360 electrical degrees, an armature having a winding with a pitch of 120 electrical degrees, a brush between each of the field pole structures, field windings, one brush being connected with one side of the circuit to which the generator supplies power, a conductor of low resistance connected with both of the two successive brushes, said conductor being independent of the field windings, a connection between said conductor and the other side of said circuit, and a field winding for connection with the source of power to be amplified.

2. A generator system comprising a generator including three field pole structures for each 360 electrical degrees, field pole windings including a pilot control winding for connection with a source of input energy, an armature with a pitch of 120 electrical degrees, brushes spaced 120 electrical degrees apart, a conductor of low resistance connecting two of said brushes together substantially to short circuit the section of the armature that operates in the field excited by current flowing in said pilot winding, said conductor being independent of said windings, an output circuit including a conductor connected with the short-circuited brushes and another conductor connected with the other brush.

3. A generator system for amplifying a pilot energy, said system comprising a generator with three field pole structures for each 360 electrical degrees, an armature having a winding with a pitch of 120 electrical degrees, field windings including a pilot winding on one field pole structure and in position to control the flux under one pole structure, brushes between the field pole structures, a low resistance conductor connected with two brushes in position substantially to short circuit the section of the armature under the pole structure on which the pilot winding is located, said two brushes being connected with one side of the circuit to which the generator supplies power, and a third brush between two poles other than the pole on which the pilot winding is located, said third brush being connected with the other side of said circuit.

4. An amplifier generator system comprising a generator with three field pole structures, for each 360 electrical degrees, field windings on at least some of said pole structures, the field windings including a pilot winding for connection with a source of power that is to be amplified, an armature having a winding with a pitch of 120 electrical degrees and that is at least partially uncompensated by the field windings, brushes between successive pole structures, a conductor connecting two successive brushes and substantially short circuiting an uncompensated section of the armature winding that is located in a field in which the excitation is controlled by the pilot winding, a conductor connecting said brushes with one side of the generator output circuit, and another brush connected with the other side of the generator output circuit.

5. An amplifier generator system comprising a generator having three field pole structures for each 360 degrees and having three brushes between said pole structures, field windings on said pole structures including a pilot winding for controlling the field excitation of one of the pole structures under which the armature reaction is at least partially uncompensated, field windings associated with the other two pole structures of the three pole structure group for exciting the field under said other two pole structures, a circuit to which power is supplied by the generator, the field windings on said other two pole structures being connected in series with said circuit, two brushes at both sides respectively of said one pole structure being shorted independently of said field windings, and said circuit being connected between the third brush and said two shorted brushes.

JOSEPH M. TYRNER.

REFERENCES CITED

The following references are of record in the file of this patent:

UNITED STATES PATENTS

| Number | Name | Date |
|---|---|---|
| 1,000,776 | Burnham | Aug. 15, 1911 |
| 1,014,395 | Hull | Jan. 9, 1912 |
| 1,862,427 | Riccia | June 7, 1932 |
| 2,388,023 | Tyrner | Oct. 30, 1945 |